(12) United States Patent
Ma et al.

(10) Patent No.: US 12,449,287 B2
(45) Date of Patent: Oct. 21, 2025

(54) ELECTROMAGNETIC SENSOR FOR MEASURING ELECTROMAGNETIC PROPERTIES OF A FLUID AND/OR A SOLID COMPRISING A FLEXIBLE SUBSTRATE

(71) Applicant: ENERCORP ENGINEERED SOLUTIONS, LLC, New Castle, DE (US)

(72) Inventors: Lu Ma, Basingstoke (GB); Andrew Hunt, Basingstoke (GB)

(73) Assignee: ENERCORP ENGINEERED SOLUTIONS, LLC, Wilmington, DE (US)

( * ) Notice: Subject to any disclaimer, the term of this patent is extended or adjusted under 35 U.S.C. 154(b) by 638 days.

(21) Appl. No.: 17/787,996

(22) PCT Filed: Dec. 21, 2020

(86) PCT No.: PCT/EP2020/087422
§ 371 (c)(1),
(2) Date: Jun. 22, 2022

(87) PCT Pub. No.: WO2021/130160
PCT Pub. Date: Jul. 1, 2021

(65) Prior Publication Data
US 2023/0013564 A1  Jan. 19, 2023

(30) Foreign Application Priority Data
Dec. 23, 2019 (GB) ..................... 1919156

(51) Int. Cl.
*G01F 1/58* (2006.01)
*G01F 1/60* (2006.01)
(Continued)

(52) U.S. Cl.
CPC ............... *G01F 1/588* (2013.01); *G01F 1/60* (2013.01); *G01F 1/74* (2013.01); *G01N 27/221* (2013.01); *G01N 27/74* (2013.01)

(58) Field of Classification Search
CPC .. G01F 1/588; G01F 1/60; G01F 1/74; G01N 27/221; G01N 27/74
(Continued)

(56) References Cited

U.S. PATENT DOCUMENTS

2013/0144548 A1   6/2013  Xie
2016/0091448 A1*  3/2016  Soleimani ............ G01N 27/221
                                                                324/654
(Continued)

FOREIGN PATENT DOCUMENTS

CN   109557114 A   4/2019
GB   2514114 A    11/2014
(Continued)

OTHER PUBLICATIONS

Combined Search and Examination Report under Sections 17 and 18(3) issued in related GB Application 1919156.8 on Jun. 12, 2020.
(Continued)

*Primary Examiner* — Nathaniel T Woodward
(74) *Attorney, Agent, or Firm* — Grollitsch Law, PLLC (57) ABSTRACT

An electromagnetic sensor for use in an apparatus for measuring electromagnetic properties of a fluid and/or a solid, the sensor comprising a substrate in the form of a plate, a plurality of first sensor elements on the substrate, the first sensor elements forming a first array of the first sensor elements on the substrate, a plurality of second sensor elements on the substrate, the second sensor elements forming a second array on the substrate, wherein the first and second arrays are regular arrays and are mutually aligned geometrically, a plurality of electrical connectors on the
(Continued)

substrate, and a plurality of electrical terminals on the substrate, the electrical connectors electrically connecting the first and second sensor elements to electrical terminals, wherein the first sensor elements each comprise a first type of sensor selected from an inductive sensor, a capacitive sensor and a magnetic sensor and the second sensor elements each comprise a second type of sensor selected from an inductive sensor, a capacitive sensor and a magnetic sensor, wherein the first type of sensor and the second type of sensor are different.

12 Claims, 5 Drawing Sheets

(51) Int. Cl.
*G01F 1/74* (2006.01)
*G01N 27/22* (2006.01)
*G01N 27/74* (2006.01)

(58) Field of Classification Search
USPC ........................................................ 73/861.11
See application file for complete search history.

(56) References Cited

U.S. PATENT DOCUMENTS

| | | |
|---|---|---|
| 2017/0139073 A1 | 5/2017 | Gorek et al. |
| 2018/0052133 A1 | 2/2018 | Godfrey et al. |
| 2019/0025105 A1 | 1/2019 | Byrd |
| 2019/0310120 A1* | 10/2019 | McCann .................... G01F 1/58 |

FOREIGN PATENT DOCUMENTS

| | | | |
|---|---|---|---|
| GB | 2530601 A * | 3/2016 | ............ G01F 1/708 |
| GB | 2534337 A * | 7/2016 | ............... G01F 1/58 |
| GB | 2530601 B | 10/2017 | |
| GB | 2534337 B | 10/2017 | |
| WO | 2003050529 A1 | 6/2003 | |
| WO | 20150142610 A1 | 9/2015 | |

OTHER PUBLICATIONS

International Search Report and Written Opinion in related international application No. PCT/EP2020/087422 issued on Apr. 28, 2021.

International Preliminary Report on Patentability in related international application No. PCT/EP2020/087422 issued on Jun. 28, 2022.

* cited by examiner

ELECTROMAGNETIC SENSOR FOR MEASURING ELECTROMAGNETIC PROPERTIES OF A FLUID AND/OR A SOLID COMPRISING A FLEXIBLE SUBSTRATE

FIELD OF THE INVENTION

The present invention relates to an electromagnetic sensor for use in an apparatus for measuring electromagnetic properties of a fluid and/or a solid, and to such a monitoring apparatus comprising such a sensor. The present invention has particular application to the measurement of the electromagnetic properties of a fluid and/or a solid, typically as a multiphase flow in a pipe. The measurement may make various electromagnetic (EM) measurements, and additionally may optionally use Magnetic Induction Tomography (MIT). Such a multiphase flow comprises fluids, and may comprise a mixture of liquids, or one or more liquids in a mixture with solids and/or gases. This invention has a number of applications, in particular within the oil and gas exploration and production industry.

BACKGROUND

A number of prior patent specifications in the name of the Applicant are directed to the use of Magnetic Induction Tomography (MIT), either used alone or in conjunction with other techniques, for monitoring a multiphase flow in a pipe, in particular in the oil and gas exploration and production industry.

In particular, GB2513678B discloses an "Oil well system and operating method including monitoring multiphase flow in a pipe", GB2513679B discloses a "Method of defining a multiphase flow comprising three phases", GB2507368B discloses "Method and apparatus for monitoring the flow of mixtures of fluids in a pipe", GB2534337B discloses "Method and apparatus for monitoring of the multiphase flow in a pipe" and GB2530601B discloses "Method and apparatus for monitoring of the multiphase flow in a pipe". In addition, GB2527324B discloses a "Segmented Electromagnetic Sensor". GB2514114A discloses an apparatus for determining one or more electromagnetic properties of a region of interest which includes at least one measurement interface for receiving inductive measurements of the region and capacitive measurements of the region. The apparatus can comprise a planar array of inductive sensors and a planar array of capacitive sensors forming a combined electrical impedance tomography (EIT) and electrical capacitance tomography (ECT) device.

In these prior specifications, transmitting and receiving coils are located around the outside of a pipe. The transmitting coil(s) are supplied with a varying current which transmits electromagnetic field into a multiphase flow within the pipe. The electromagnetic field induces eddy currents in an electrically conductive phase within the pipe resulting in a secondary electromagnetic field. The secondary electromagnetic field induces an electric field which can be measured in the receiving coil(s) via voltage output that can be analysed to determine properties of the multiphase flow.

It is disclosed is these specifications that electromagnetic fields and/or energy can provide information related to certain physical properties of materials in the multiphase flow exposed to this type of energy. When used in an electromagnetic flowmeter, electrical capacitance tomography (ECT), electrical resistance tomography (ERT) and magnetic inductance tomography (MIT) can be used to interrogate the multiphase flow. In each case a varying electric or magnetic field can be applied across the multiphase flow, and measurements of voltage, current and magnetic field can be used to measure certain physical parameters of the constituent components of the multiphase flow.

Currently, electrical conductivity and electrical permittivity are measured using different sensing mechanisms via their respective corresponding sensor apparatus. It is often required to process the two measurements using complicated processing steps so that these raw measurements are co-located in space and time.

It is known to combine an MIT apparatus configured to measure electrical conductivity with another apparatus configured to measure electrical permittivity in a composite system to measure both the electrical conductivity and the electrical permittivity in a region of interest. However, the primary problem with this measurement technique is that the use of two apparatus requires the operation of the respective apparatus, i.e. the MIT apparatus configured to measure electrical conductivity and the other apparatus configured to measure electrical permittivity, to take place in sequence, both in time and in space. This measurement technique therefore suffers from the problem of both temporal and spatial lags between two sets of measurements, i.e. electrical conductivity and electrical permittivity.

Thus although inductive sensors are known for electrical conductivity measurement and capacitive sensors are known for electrical permittivity measurement, it is not known in the art to provide a sensor system that measures any electromagnetic property or combinations of electromagnetic properties of the target specimen at the same point in space and time.

Although the prior art summarised above discloses a method of, and a monitoring apparatus for, monitoring a multiphase fluid, for example a flow in a pipe, using magnetic induction tomography (MIT) which can effectively monitor such a multiphase fluid, there is nevertheless a need in the art for an improved monitoring apparatus and method.

In particular, there is a need in the art for an electromagnetic sensor, and an associated monitoring apparatus incorporating such a sensor, which has an enhanced sensitivity to distinguish between an electrically conductive phase such as an aqueous phase, for example water, and an electrically non-conductive phase, such as an oil phase or a solid phase such as sand, in a multiphase fluid, for example in a multiphase flow.

There is a need in the art for an electromagnetic sensor which has low cost and complexity yet can accurately and reliably measure plural electromagnetic properties of a subject of interest, the electromagnetic properties including at least two of electrical conductivity, magnetic permeability and electrical permittivity.

SUMMARY OF THE INVENTION

The present invention aims, at least partially, to meet this need in the art, particularly in the field of oil and gas exploration and production, to provide enhanced analytical data in real-time on the phase composition of a multiphase fluid, particularly a multiphase flow within a pipeline used in the oil and gas industry. However the invention also has application for the monitoring of static fluids, such as multiphase fluids and/or static solids, and in other applications in different technical and commercial fields.

The present invention accordingly provides an electromagnetic sensor for use in an apparatus for measuring electromagnetic properties of a fluid and/or a solid.

The present invention further provides an apparatus for measuring electromagnetic properties of a fluid and/or a solid method of monitoring a multiphase fluid.

The present invention additionally provides an electromagnetic sensor for use in an apparatus for measuring electromagnetic properties of a fluid and/or a solid.

The present invention yet further provides an apparatus for measuring electromagnetic properties of a fluid and/or a solid method of monitoring a multiphase fluid.

The preferred embodiments of the present invention can provide an electromagnetic sensor which has low cost and complexity yet can accurately and reliably measure plural electromagnetic properties of a subject of interest, the electromagnetic properties including at least two of electrical conductivity, magnetic permeability and electrical permittivity. Additionally, these electromagnetic properties can be combined to derive other material properties.

The preferred embodiments of the present invention can provide an electromagnetic sensor which comprises a combination of any two or more of a magnetic sensor, an inductive sensor and a capacitive sensor that allows the measurement of any electromagnetic property or combinations of electromagnetic properties of the target specimen at the same point in space and time.

This electromagnetic sensor may be used in an apparatus that measures any electromagnetic property or combinations of electromagnetic properties of the target specimen at the same point in space and time.

For example, for target specimens with varying conductivity and permittivity in a temporal and spatial domain, simultaneously measuring both of these electrical properties using a single electromagnetic sensor according to the preferred embodiments of the present invention can enhance the measurement accuracy.

The electromagnetic sensor may have a structure which allows a number of sensor elements to be connected together electrically to form any desired physical combination and to be configured to perform any desired operation mode. The sensor structure may also allow the physical dimension and operating mode of each sensor element within the structure to be configured to achieve optimum measuring or monitoring performance for a target specimen, for example a multiphase flow, with varying properties in structural, spatial and time domains. The sensor configuration may be fixed, or dynamically controlled, for example via an external switch control circuitry or firmware.

The preferred embodiments of the present invention can provide an electromagnetic sensor which can be produced by printing sensor elements onto a printed circuit board, or a flexible foil or other material, and therefore the electromagnetic sensor has a low cost of production.

The preferred embodiments of the present invention can provide an electromagnetic sensor which can simplify the hardware requirement of a sensor system for measuring plural electromagnetic properties or parameters in a fluid and/or a solid to be investigated, and also can enhance the measurement accuracy by measuring subject of interest containing plural electromagnetic properties at the same point in time and space.

The present invention relates specifically to an improved electromagnetic sensor, and associated apparatus, for the use of MIT (Magnetic Induction Tomography), in particular in the application of MIT to measuring multiphase flows in the oil and gas and other industries. The principle of MIT is that electric coils are excited with alternating current that results in the coils producing varying electromagnetic fields. The object of interest is placed within these fields and the varying field induces varying currents within the object that is dependent on the conductivity of the object. The varying currents in the object produce secondary electromagnetic fields that can be received by the same or other coils, which act as inductive sensors. The received secondary electromagnetic field in conjunction with the primary imposed electromagnetic field can be used to compute the conductivity contrast between the object and the material that surrounds it.

In addition, the measurement of electrical permittivity using capacitive sensors and magnetic permeability using magnetic sensors, at the same place and time, provides further information on electrically conductive and electrically non-conductive phases in the object of interest. Plural electromagnetic parameters are measured by a single sensor on an object in the same space and time.

The preferred embodiments of this invention relate to an electromagnetic sensor and an apparatus comprising such a sensor to measure the flow of mixtures of fluids from a well or group of wells during oil and gas exploration, production or transportation operations.

However, it should be understood that the sensor and apparatus of the present invention may be used in other potential applications, as those skilled in the art will appreciate. For example, the sensor and apparatus of the present invention may be used in flow measurement devices, medical MIT Systems involving measurement of low conductivity contrasts of multiphase fluid flows, and multiphase process monitoring equipment, and to measure solid objects.

BRIEF DESCRIPTION OF THE DRAWINGS

Embodiments of the present invention will now be described, by way of example only, with reference to the accompanying drawings, in which.

DETAILED DESCRIPTION

Referring to FIGS. 1 to 4, there is shown an electromagnetic sensor 2 for use in an apparatus for measuring electromagnetic properties of a fluid and/or a solid. The drawings are schematic and not to scale for the purpose of clarity of illustration.

Figure 1:
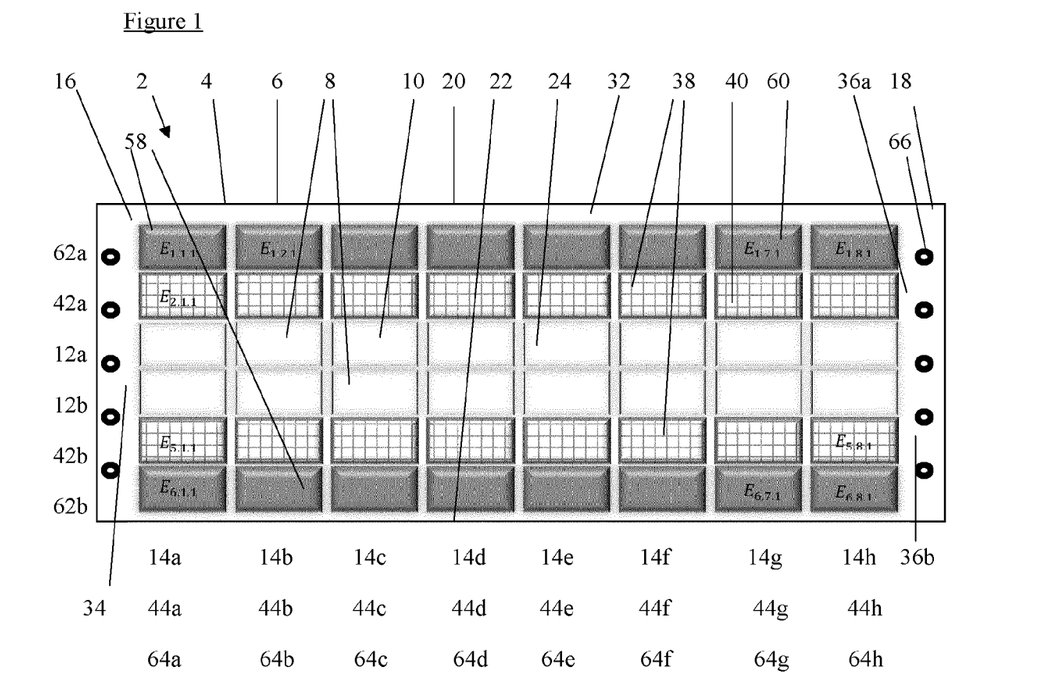
FIG. 1 is a schematic plan view of an electromagnetic sensor for use in an apparatus for measuring electromagnetic properties of a fluid and/or a solid in accordance with an embodiment of the present invention.

The sensor 2 comprises a substrate 4 in the form of a plate 6. Typically, the substrate 4 comprises a printed circuit board which is flexible. The substrate 4 has a rectangular shape because in this embodiment the electromagnetic sensor 2 is configured to be flexed so as to be located around a pipe, as described hereinbelow; however, in other embodiments the substrate 4 but may have any other shape to enable the electromagnetic sensor 2 to be located relative to any other body for measuring the electromagnetic properties of a fluid and/or a solid in or comprised by the body. The external dimensions of the substrate 4 are selected to enable the electromagnetic sensor 2 to be located relative to the body to be used in the measurement.

In alternative embodiments, the electromagnetic sensor 2 may be rigid and intended to be used in a planar configuration, either alone or coupled to one or more further electromagnetic sensors 2. The electromagnetic sensor 2 may alternatively be semi-rigid, i.e. deformable but not readily flexible. A plurality of first sensor elements 8 are provided on the substrate 4 to form a first array 10 of the first sensor elements 8 on the substrate 4. The first array 10 is a regular array, i.e. the first array 10 has a systematic arrangement of the first sensor elements 8.

In this embodiment, the first array 10 is a rectangular array 10 comprising two parallel rows 12a, 12b of the first sensor elements 8 extending between opposite ends 16, 18 of the substrate 4 and eight columns 14a-14h of the first sensor elements 8. In general, the rectangular array 10 comprises m rows and n columns, where m≥1 and n>1, and in FIG. 1 m=2 and n=8. The rows 12a-b are parallel to the opposite sides 20, 22 of the substrate 4 which connect the opposite ends 16, 18 and the columns 14a-14h are parallel to the opposite sides 20, 22. In this embodiment, the rows 12a, 12b of the first sensor elements 8 are adjacent to each other and the columns 14a-14h are adjacent to each other.

Figure 2:
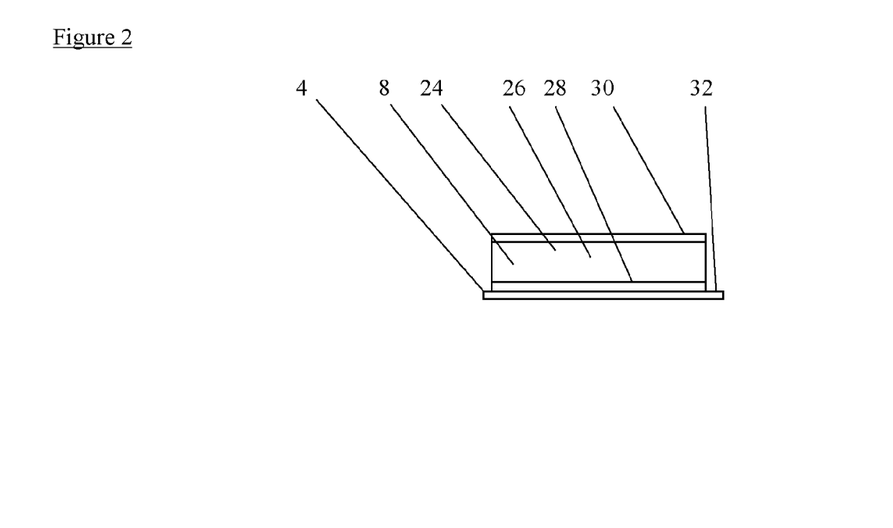
FIG. 2 is an enlarged schematic cross-section of a capacitive sensor for transmitting or receiving electromagnetic radiation in the apparatus of FIG. 1.

In this embodiment, the first sensor elements 8 each comprise a capacitive sensor 24. As shown in FIG. 2, the capacitive sensor 24 comprises a central layer 26 of dielectric material between opposite layers 28, 30 of electrically conductive material. The electrically conductive material is typically selected from copper, graphene, or carbon.

Preferably, the first sensor elements 8 are printed onto a surface 32 of the substrate 4.

In addition to the first sensor elements 8, a plurality of second sensor elements 38 are provided on the substrate 4 to form a second array 40 on the substrate. Like the first array 10, the second array 40 is a regular array.

The first and second arrays 10, 40 are mutually aligned geometrically, i.e. there is a systematic relationship between the arrangement of the first sensor elements 8 in the first array 10 and the second sensor elements 38 in the second array 40.

In this embodiment, the second array 40 is a rectangular array 40 comprising two parallel rows 42a, 42b of the second sensor elements 38 extending between the opposite ends 16, 18 of the substrate 4 and eight columns 44a-44h of the second sensor elements 38. Like the first array 10, in general the rectangular array 40 comprises m rows and n columns, where m≥1 and n>1, and in FIG. 1 m=2 and n=8. The rows 42a, 42b are parallel to the opposite sides 20, 22 of the substrate 4 which connect the opposite ends 16, 18 and the columns 44a-44h are parallel to the opposite sides 20, 22. The columns 44a-44h are adjacent to each other.

The rows 42a, 42b of the second sensor elements 38 are mutually spaced and are located on respective opposite sides of the adjacent rows 12a, 12b of the first sensor elements 8. Therefore the adjacent rows 12a, 12b of the first sensor elements 8 extend centrally along a length of the substrate 4, whereas the spaced rows 42a, 42b of the second sensor elements 38 extend along a length of the substrate 4 at locations laterally outwardly, in a width direction, of the centre of the substrate 4.

In the embodiment of FIGS. 1 to 4, the first array 10 is located on a central region 34 of the substrate 4 and the second array 40 is located on mutually spaced side regions 36a, 36b of the substrate 4 which are on respective opposite sides of the central region 34 of the substrate 4. However, the location of the first and second arrays 10, 40 with respect to these regions may be reversed.

The columns 14a-14h of the first sensor elements 8 are aligned with the columns 44a-44h of the second sensor elements 38. Accordingly, in the illustrated embodiment there are 8 columns of the first and second sensor elements 8, 38 in combination and aligned in each column.

In the illustrated embodiment, each first sensor element 8 is mutually spaced, in the direction of a plane extending parallel to the substrate 4, from the second sensor elements 38 and each second sensor element 38 is mutually spaced, in the direction of a plane extending parallel to the substrate 4, from the first sensor elements 8. Furthermore, in the illustrated embodiment the substrate 4 comprises the layer 6 which defines a common mounting surface 32 of the substrate 4 and the first and second arrays 10, 40 are mounted on the common mounting surface 32. The spacing, in the direction of a plane extending parallel to the substrate 4, between the first and second sensor elements 8, 38 may be selected as desired, according to the shape and dimensions of the electromagnetic sensor 2 and the number of rows and columns of the first and second arrays 10, 40.

The crosstalk between the first and second sensor elements 24, 38 is preferably screened off by a screening material disposed between the sensor elements 24, 38. For example, when the sensor elements 24, 38 are printed on a printed circuit board, a grounded copper layer of the printed circuit board may be employed as a screening material.

In this embodiment, the first and second sensor arrays 10, 40 at least partly overlap; in particular, the second sensor array 40 is on opposite sides of the central first sensor array 10. In alternative embodiments, the first and second sensor arrays 10, 40 may be in a side-by-side configuration, so that the first and second sensor arrays 10, 40 do not overlap.

Figure 3:
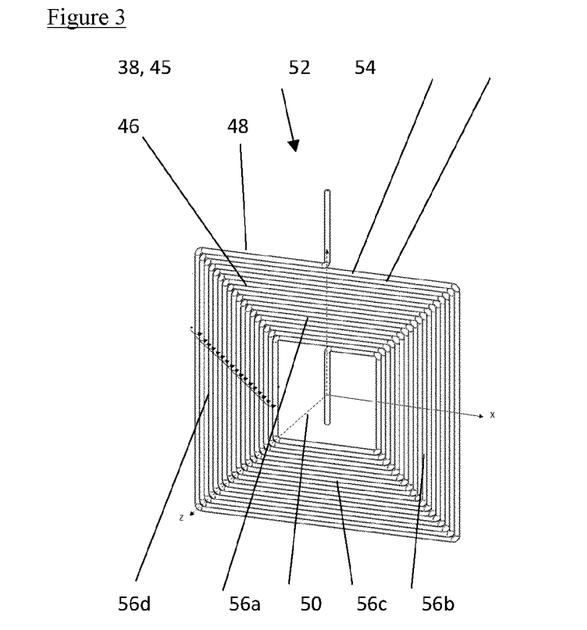
FIG. 3 is an enlarged schematic perspective view an inductive sensor for transmitting or receiving electromagnetic radiation in the apparatus of FIG. 1.

In this embodiment, the second sensor elements 38 each comprise an inductive sensor 45. As shown in FIG. 3, the inductive sensor 45 comprises a coil 46 of electrically conductive material 48 which is wound about a central axis 50 to form at least one turn 52, typically from 1 to 120 turns 52. Typically, the electrically conductive material 48 in the coil 46 has a width of from 50 to 10,200 µm. In the illustrated embodiment, each turn 52 is in a common plane so that the coil 46 is planar and in a single layer 54 of the inductive sensor 45. The layer 54 of the inductive sensor 45 may have a thickness of from 25 to 1600 µm.

In an alternative embodiment, the coil 46 is non-planar and formed in 1 to 8 layers, optionally 2 to 8 layers, of the inductive sensor 45, each layer of the inductive sensor comprising at least one turn, typically from 1 to 120 turns, and each layer of the inductive sensor may have a thickness of from 25 to 1600 μm.

Typically, adjacent turns 52 in the coil 46 are separated by a spacing of from 50 to 10,200 μm.

In the illustrated embodiment, each turn 52 is composed of a plurality of linear sections 56a, 56b, 56c, 56d and the coil 46 is polygonal in plan. Typically, each turn 52 is composed of four linear sections 56a, 56b, 56c, 56d and the coil 46 is rectangular in plan. The rectangular coil 46 typically has a width:length ratio of from 1:2 to 2:1, and preferably the coil 46 has a minimum inner width and a maximum outer width, and a ratio between the minimum inner width and the maximum outer width is from 0.2:1 to 0.8:1.

Preferably, the second sensor elements 38 are also printed onto the surface 32 of the substrate 4.

Preferably, the first and second sensor elements 8, 38 each have a common shape and configuration, and dimensions, in the direction of a plane extending parallel to the substrate 4. In the illustrated embodiment, the first and second sensor elements 8, 38 are rectangular; however, other shapes and configurations, and dimensions, may be used.

The first and second arrays 10, 40 are rectangular; however in other embodiments they may have any other geometrical shape or arrangement, for example, circular or triangular.

In accordance with the present invention, the first and second types of sensor 8, 38 are different, so that two different types of sensor 8, 38 are incorporated into the common electromagnetic sensor 2 and provided on the same substrate 4 in a specific geometrical alignment. The first and second types of sensor 8, 38 are configured to measure different properties of the fluid and/or solid to be measured by the electromagnetic sensor 2.

The capacitive sensor 24 is configured to measure electrical permittivity of an electrically non-conductive medium of the fluid and/or solid to be measured by the electromagnetic sensor 2, whereas the inductive sensor 45 is configured to measure electrical conductivity of an electrically conductive medium of the fluid and/or solid to be measured by the electromagnetic sensor 2.

In the first embodiment illustrated in FIGS. 1 to 4, the first and second types of sensor 8, 38 respectively comprise the capacitive sensors 24 and the inductive sensors 45. In other embodiments, these two types of sensor may be reversed, or either type of sensor may be replaced by any other sensor of a different type. For example, in other embodiments, either of the capacitive sensors 24 or the inductive sensors 45 may be replaced by a magnetic sensor. A magnetic sensor can measure magnetic permeability of the fluid and/or solid to be measured by the electromagnetic sensor 2. Each magnetic sensor typically comprises a layer of ferromagnetic or ferrimagnetic material, and the ferromagnetic or ferrimagnetic material may be electrically conductive or electrically non-conductive. The magnetic sensor is preferably printed on the substrate 4.

In one modified embodiment, the first and second types of sensor 8, 38 may respectively comprise capacitive sensors and magnetic sensors, whereas in another modified embodiment the first and second types of sensor 8, 38 may respectively comprise magnetic sensors and inductive sensors.

In a further modified embodiment, the sensors may comprise three sensor types, each in a respective regular array geometrically aligned with the other arrays, and comprise, in combination, capacitive sensors, inductive sensors and magnetic sensors. The third sensor elements may have the same shape and configuration, and dimensions, in the direction of a plane extending parallel to the substrate as the first and second sensor elements 8, 38.

The electromagnetic sensor 2 of the illustrated embodiment further comprises a plurality of guard elements 58 provided on the substrate 4. The guard elements 58 form a fourth array 60 which comprises two parallel outer rows 62a, 62b of guard elements 58 in columns 64a-64h. Each outer row 62a, 62b of guard elements 58 extends along a respective opposite edge of the substrate, in particular along the opposite sides 20, 22 of the substrate 4. The columns 14a-14h, 44a-44h and 64a-64h are aligned.

Each guard element 58 comprises a coil or an electrode which is adapted, when electrically energized in use, to provide a screening electromagnetic field defining an extremity of a sensing zone of the electromagnetic sensor 2.

The guard elements 58 may have the same shape and configuration, and dimensions, in the direction of a plane extending parallel to the substrate as the first and second sensor elements 8, 38.

Accordingly, the first and second sensor elements 8, 38 and the guard elements 58 are provided on the substrate in the form of a rectangular grid having elements $E_{m,n,z}$, where m≥1, n≥1, z≥1, where m is the number of rows, n is the number of column and z is the number of layers, for any combination of m, n and z. Interconnections may be made along any axis of the grid. The electromagnetic sensor 2 further comprises a plurality of electrical connectors (not shown), and a plurality of electrical terminals 66, on the substrate 4. The electrical connectors electrically connect the sensor elements 8, 38, and the guard elements 58, to the electrical terminals 66 according to a predetermined wiring diagram. The electrical connectors may be formed from a layer, e.g. an etched copper layer, within the printed circuit board. Alternatively or additionally, the electrical connectors may comprise wires, e.g. of copper, bonded, e.g. by soldering, to both the electrical terminals 66 and to an electrical contact on the sensor.

In the illustrated embodiment, the sensor elements 8, 38, and the guard elements 58 are provided on the common mounting surface 32 of the substrate 4. However, in an alternative embodiment the sensor elements 8, 38, and the guard elements 58 may be provided, in any configuration, on opposite surfaces of the substrate 4. Accordingly, the substrate 4 may comprises a layer 6 defining, on opposite sides of the layer 6, first and second mounting surfaces of the substrate 4 and the first and second arrays 10, 40 are respectively mounted on the first and second mounting surfaces.

Figure 4:
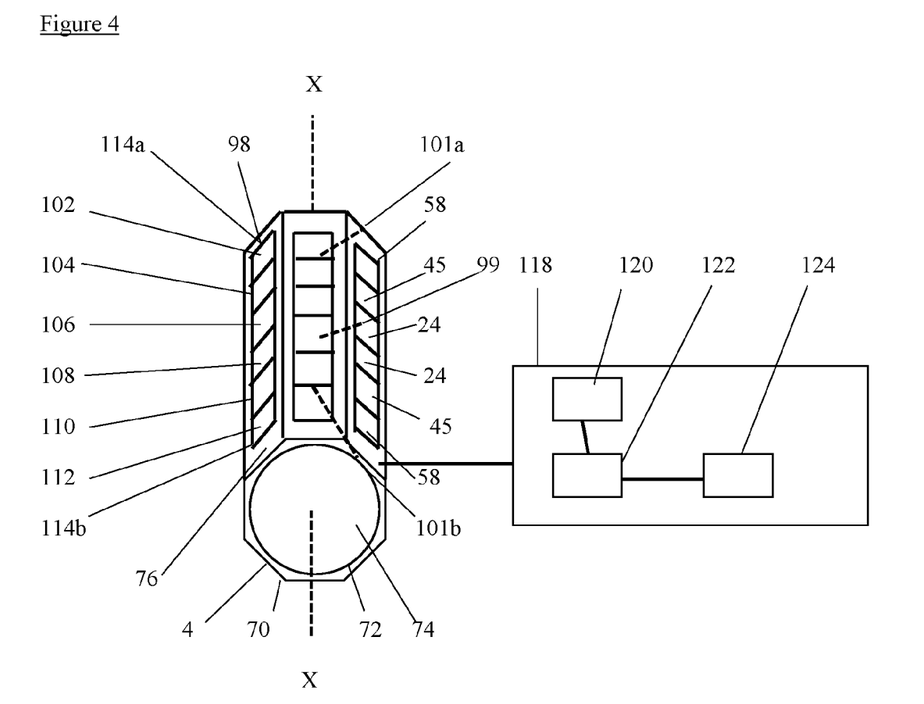
FIG. 4 is a schematic perspective view of the sensor of FIG. 1 flexed around a pipe to form an apparatus for measuring electromagnetic properties of fluid and/or solid media in the pipe.

Referring to FIG. 4, as described above in the illustrated embodiment the substrate 4 is flexible. The substrate 4, and therefore the entire electromagnetic sensor 2, can be flexed to form a ring 70 surrounding a central axis X-X. A pipe 72 defining a flow conduit 74 may, in use, extend along the central axis X-X, and in use the flow conduit 74 contains a fluid flow, which may comprise fluid, typically multiphase fluid comprising one or more liquid phases, optionally in combination with a gas phase and/or a solid phase.

The electromagnetic sensor 2 defines a central measurement zone extending along the central axis X-X in which the fluid flow is located during the measurement of the electromagnetic properties of the fluid flow. In the illustrated embodiment the ring 70 is a closed ring completely surrounding the central axis X-X; in an alternative embodiment, the ring 70 is an open ring partly surrounding the central axis X-X.

The first and second arrays 10, 40 are configured to form a plurality of annular arrays of the first or second sensor elements 8, 38 surrounding the central axis X-X when the substrate 4 is flexed to form the ring 70. Each annular array is formed from a row 12, 42 of the respective first or second sensor elements 8,38 in the respective first and second arrays 10, 40.

In the illustrated embodiment, the substrate 4 is flexed so that the ring 70 is polygonal, thereby to have a segmented ring structure. Each polygonal face 76 has provided thereon at least one column 14, 44 of the first and second sensor elements 8, 38 in the respective first and second arrays 10, 40. Each polygonal face 76 also comprises the guard elements 58 of the respective columns, and, if additionally present optionally the third sensor elements. In the illustrated embodiment, there are eight columns and consequently eight polygonal faces 77 and the polygonal ring 70 has a cross-section in the form of a regular octagon.

In alternative embodiments, the substrate 4 may be flexed so that the ring 70 circular, and each sensor element and guard element is curved in cross-section.

The plurality of annular arrays of the first and second sensor elements 8, 38 comprise a sequence 98 extending in a direction parallel to the central axis X-X. In the illustrated embodiment, the sequence comprises a first annular array 102 of the guard elements 58, a second annular array 104 of the inductive sensors 45, a third annular array 106 of the capacitive sensors 24, a fourth annular array 108 of the capacitive sensors 24, a fifth annular array 110 of the inductive sensors 45, and a sixth annular array 112 of the guard elements 58. It may be seen that an annular array 102, 112 of the guard elements 58 at each end 114*a*, 114*b* of the sequence 98, and the centre of the sequence 98 comprises at least one annular array of each of the first and second sensor elements 8, 38.

The electromagnetic sensor 2 may be used in a monitoring apparatus for monitoring a multiphase flow in a pipe using magnetic induction tomography by use of the induction sensors 45, and using permittivity measurements by use of the capacitive sensors 24. This arrangement has particular application in the oil industry.

As shown in FIG. 4, the electromagnetic sensor 2 surrounds the pipe 72 defining a flow conduit 74. In use, typically a multiphase flow flows along the flow conduit 74 of the pipe 72. The multiphase flow comprises at least two phases, optionally at least three phases, further optionally all of the phases, selected from an oil phase, an aqueous phase, a solid phase and a gaseous phase. The multiphase flow typically has a primary or continuous phase of the flow, e.g., oil, water or gas, and within the primary phase one or more other phase constituents may be present, for example a solid phase, e.g. sand. The flow regime of these phases can vary significantly depending on the concentrations of each phase and the flow rate.

The portion of the pipe 72 surrounded by the electromagnetic sensor 2 is preferably composed of a material, for example a non-metallic material such as a polymer, which permits electromagnetic field penetration, across a broad wavelength range, emitted from the first and first and second sensor elements 8, 38, and the guard elements 58, when acting as transmitters as described below, to pass through the multiphase material in the flow conduit 74 and then secondary induced electromagnetic radiation to be received by the first and second sensor elements 8, 38, when acting as receivers as described below.

The second annular array 104 of the inductive sensors 45, the third annular array 106 of the capacitive sensors 24, the fourth annular array 108 of the capacitive sensors 24, and the fifth annular array 110 of the inductive sensors 45 are each independently driven to independently measure the electromagnetic properties of the media to be measured within an imaging space 99 surrounded by these arrays 104-110.

The first annular array 102 of the guard elements 58 and the sixth annular array 112 of the guard elements 58 are driven to provide opposite electromagnetic fields that define respective opposite longitudinal ends 101*a*, 101*b* of the imaging space 99 so that only media within the imaging space 99 are measured by the capacitive sensors 24 and the inductive sensors 45.

In the illustrated embodiment, in one transmitting/receiving cycle one of the sensors 8, 38 in each of the second annular array 104 of the inductive sensors 45, the third annular array 106 of the capacitive sensors 24, the fourth annular array 108 of the capacitive sensors 24, and the fifth annular array 110 of the inductive sensors 45, is configured to function as a transmitter coil, and a diametrically opposite sensor 8, 38 respectively in each of the second annular array 104 of the inductive sensors 45, the third annular array 106 of the capacitive sensors 24, the fourth annular array 108 of the capacitive sensors 24, and the fifth annular array 110 of the inductive sensors 45, is configured to function as a receiver coil.

However, each of the sensors 8, 38 may be adapted to transmit an electromagnetic field into the flow conduit 74 when energized by an input electrical signal and/or to receive an electromagnetic field from the flow conduit 74 and generate an output electrical signal, as described in detail hereinafter.

In one embodiment one of the sensors 8, 38 is always a transmitter and an opposite sensor 8, 38 is always a receiver; in other embodiments the sensors 8, 38 alternate between functioning as the transmitter and as the receiver. In the preferred embodiment, in each of the second annular array 104 of the inductive sensors 45, the third annular array 106 of the capacitive sensors 24, the fourth annular array 108 of the capacitive sensors 24, and the fifth annular array 110 of the inductive sensors 45, in a first transmitting/receiving cycle, one of the sensors 8, 38 in the respective array acts as a transmitter and the remaining sensors 8, 38 in the respective array act as receivers, and in a following transmitting/receiving cycle another one of the sensors 8, 38 in the respective array acts as a transmitter and the remaining sensors 8, 38 in the respective array act as receivers, and in further transmitting/receiving cycles different sensors 8, 38 are sequentially use as the transmitter, with the remaining sensors 8, 38 used as the receiver.

Fundamentally, any arrangement or control of the sensors 8, 38 may be employed which can transmit an electromagnetic field into the multiphase flow in the flow conduit 6 and receive a resultant electromagnetic field from the multiphase flow in the flow conduit, and thereby generate an output electrical signal to be used to analyse the phase composition of the multiphase flow.

By providing at least two types of sensor 8, 38, having different structure and function and thereby having different measurement parameters, on a common substrate a single electromagnetic sensor 2 can be provided which accurately interrogates plural electromagnetic parameters, for example electrical conductivity and electrical permittivity, simultaneously and within a common measurement volume.

The sensors 8, 38, and guard sensors 58, are electrically connected to a controller 118. The controller 118 comprises a driver 120 for providing alternating electrical current, i.e. AC current, at a selected frequency to any of the sensors 8, 38 acting as a transmitter. Typically, the AC current has a frequency of from 1 kHz to 30 MHz, for example from 1 kHz to 10 MHz.

Preferably, the self-resonance of the inductive sensor 45 and the capacitive sensor 24 is significantly different from the frequency of the electrical signal used to excite the sensors, and preferably the self-resonance frequency of the inductive sensor 45 and the capacitive sensor 24 is at least 1.25 times larger than the excitation frequency used.

The controller 118 also comprises a data acquisition system 122, coupled to a processor 124. The data acquisition system 122 receives the induced electrical current from any of the sensors 8, 38 acting as a receiver, and the current is analysed, by use of the processor 124, to provide an output signal which can provide, or be further analysed to provide, a phase difference measurement, of the multiphase flow, by measuring electrical conductivity by magnetic induction tomography from the outputs of the induction sensors and by analysing the outputs of the capacitive sensors with respect to permittivity. Signal processing may be user to separate the mixed signals from the plural types of sensor.

Thus a varying electric current is passed through the transmitting sensor 8, 38, which may have the properties of a sine wave, or another form, e.g. square wave, and all other potential forms of varying current are encompassed by the present invention. The varying electric current passing through the transmitting sensor 8, 38 generates a varying electromagnetic flux through the multiphase flow that is within the pipe 72.

Depending on the physical properties of the different phases that the electromagnetic flux lines interrogate and in particular the electrical conductivity and electrical permittivity contrast between the phases, for example the oil and aqueous phases, a varying current is induced in any electrically conductive phase. This induced current in turn generates a secondary varying electromagnetic field that propagates through the pipe 72 and is picked up by any sensor 8, 38 that is used as a receiver. The secondary varying electromagnetic field therefore induces a varying current in the receiver. By comparing the driving and induced currents using appropriate processing, for example, the phase shift between the signals, allows the electrical conductivity and electrical permittivity contrast between the materials of the multiphase flow to be computed.

The illustrated embodiment comprises sensors 8, 38, which can function in a fixed operating mode, i.e. some sensors 8, 38 act only as a transmitter and other sensors 8, 38 act only as a receiver, or in a dynamic operating mode, i.e. the sensors 8, 38 can be switched so as to alternate between functioning as a transmitter and as a receiver.

It will be appreciated by those skilled in the art that the sequencing may take place in any order and that a complete cycle of measurements, that is, where every sensor has been the transmitter once, can occur very rapidly with, e.g., 160 to 8000, or 500 to 5000, measurement cycles every second. This frequency is primarily limited only by the processing power of the processor 124. It will also be appreciated by those skilled in the art that after one complete cycle of measurements a mesh of properties is produced that can be processed to provide a mesh or image of the multiple phases across the section of the pipe.

In one embodiment, the electrical current may be selectively switched through selected sensors 8, 38 in the annular arrays to provide a composite electromagnetic field generated from the energized sensors 8, 38, when transmitting, and the energized sensors 8, 38 have a controllable focal point within the pipe 72.

In another embodiment, the electrical current may be selectively switched through selected sensors 8, 38 in the annular arrays to provide a composite electromagnetic field received by the sensors 8, 38, when receiving, from a controllable focal point within the pipe 72. The controllable focal point may be scanned across the annular arrays of sensors 8, 38 to scan the generated electromagnetic field across a cross-section of the pipe 72 and/or along a flow direction along the pipe 72. The scanning of the controllable focal point may be across a plurality of points to provide a pixelated image of the multiphase flow in an image space.

Figure 5:
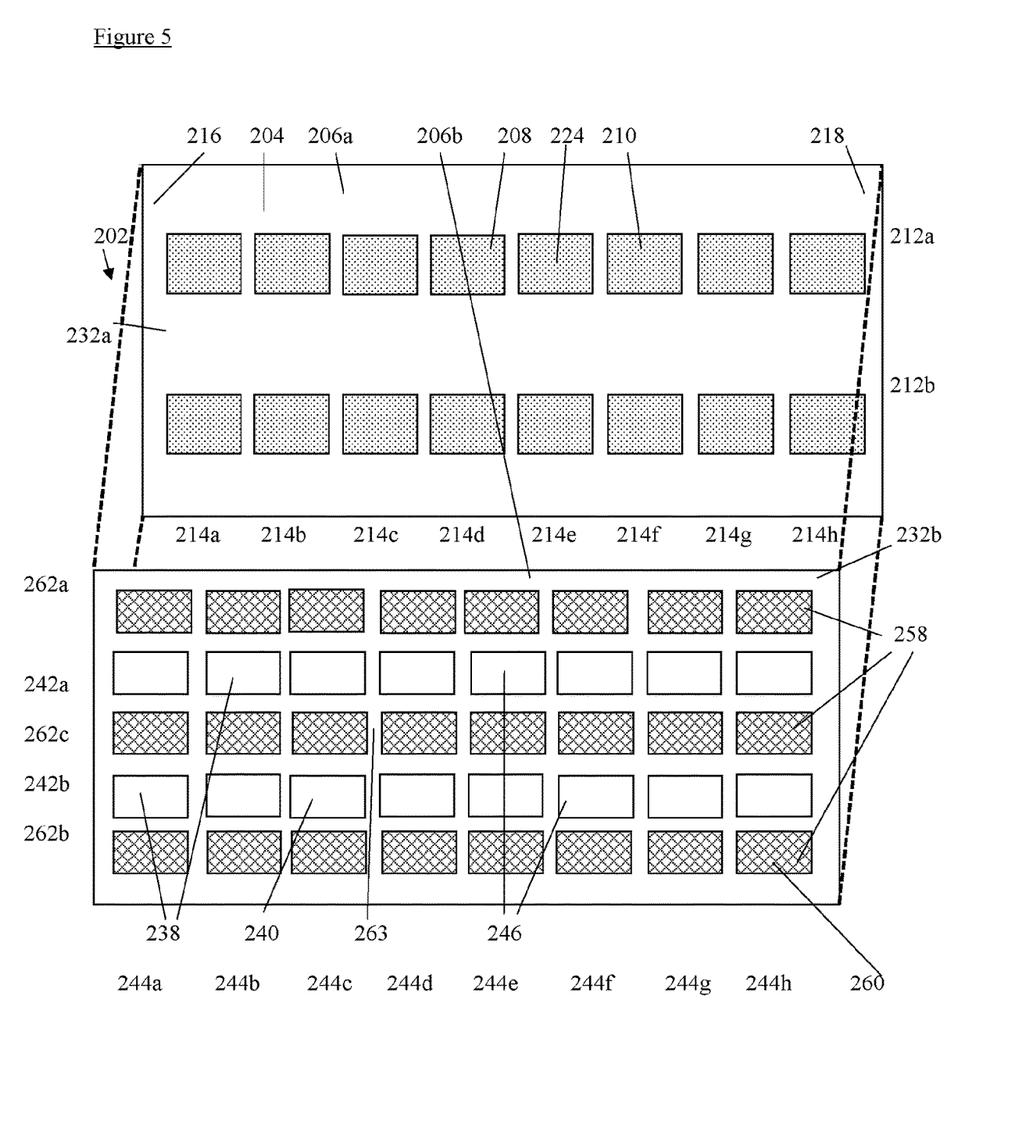
FIG. 5 is a schematic exploded perspective view of an electromagnetic sensor for use in an apparatus for measuring electromagnetic properties of a fluid and/or a solid in accordance with a second embodiment of the present invention.

A second embodiment of the electromagnetic sensor of the present invention is illustrated in FIG. 5.

The second embodiment differs from the first embodiment by providing (i) that the first and second sensors at least partly overlap and (ii) the substrate comprises plural layers, although in alternative embodiments these modifications can be provided independently.

Referring to FIG. 5, the electromagnetic sensor 202 comprises a substrate 204 in the form of a pair of first and second plates 206a, 206b which are laminated together to form the common substrate 204. Each of the first and second plates 206a, 206b, and thereby the entire substrate 204, comprises a printed circuit board which is flexible.

A plurality of first sensor elements 208 comprising capacitive sensors 224 are provided on the first plate 206a of the substrate 204 to form a first array 210 of the first sensor elements 208 on the substrate 204. The first array 210 is a regular array.

In this embodiment, the first array 210 is a rectangular array 210 comprising two parallel rows 212a, 212b of the first sensor elements 208 extending between opposite ends 216, 218 of the substrate 204 and eight columns 214a-214h of the first sensor elements 208. In this embodiment, the rows 212a, 212b of the first sensor elements 208 are spaced from each other and the columns 214a-214h are adjacent to each other.

A plurality of second sensor elements 238 are provided on the second plate 206b of the substrate 204 to form a second array 240 on the substrate. Like the first array 210, the second array 240 is a regular array. In the illustrated embodiment, the first and second arrays 210, 240 are mounted on respective mounting surfaces 232a, 232b of the first and second plates 206a, 206b. Accordingly, the substrate 204 comprises a first plate 206a defining a first mounting surface 232a and a second plate 206b defining a second mounting surface 232b, wherein the first and second plates 206a, 206b are laminated together to form the substrate 204, wherein the first and second arrays 210, 240 are respectively mounted on the first and second mounting surfaces 232a, 232b of the respective first and second plates 206a, 206b.

The first and second arrays 210, 240 are mutually aligned geometrically.

In this embodiment, the second array 240 is a rectangular array 240 comprising two parallel rows 242a, 242b of the second sensor elements 238 extending between the opposite ends 216, 218 of the substrate 204 and eight columns 244a-244h of the second sensor elements 238. The rows 242a, 242b of the second sensor elements 238 are mutually spaced. The columns 244a-244h are adjacent to each other.

The rows 212a-212b of the first sensor elements 208 are parallel to the rows 242a-242b of the second sensor elements 238 and the columns 214a-214h of the first sensor elements 208 are aligned with the columns 244a-244h of the second sensor elements 238. Accordingly, in the illustrated embodiment the first and second sensor elements 208, 238 are positioned so that when the first and second plates 206a, 206b are laminated together to form the common substrate 204, the first and second sensor elements 208, 238 are aligned and at least partly overlap. The shape and dimensions of the first and second sensor elements 208, 238 may provide complete overlap between each pair of first and second sensor elements 208, 238. Accordingly, at least one, or each, first sensor element 208 at least partly overlaps, in the direction of a plane extending parallel to the substrate 204, a respective second sensor element 238 and at least one, or each, second sensor element 238 at least partly overlaps, in the direction of a plane extending parallel to the substrate 204, a respective first sensor element 208.

The at least partly overlapping first and second sensor elements 208, 238 are on respective first and second mounting surfaces 232a, 232b of first and second layers 206a, 206b laminated together to form the substrate 204.

As for the first embodiment, the first and second types of sensor 208, 238 respectively comprise the capacitive sensors 224 and the inductive sensors 246. In other embodiments, these two types of sensor may be reversed, or either type of sensor may be replaced by any other sensor of a different type. For example, in other embodiments, either of the capacitive sensors 224 or the inductive sensors 246 may be replaced by a magnetic sensor.

In a further modified embodiment, the sensors may comprise three sensor types, each in a respective regular array geometrically aligned with the other arrays, and comprise, in combination, capacitive sensors, inductive sensors and magnetic sensors.

The electromagnetic sensor 202 further comprises a plurality of guard elements 258 provided on the substrate 204. The guard elements 258 form a fourth array 260 which comprises two parallel outer rows 262a, 262b of guard elements 258, and a parallel central row 262c of guard elements 258. Each outer row 262a, 262b of guard elements 258 extends along a respective opposite edge of the substrate 204, and the central row 262c of guard elements 258 extends between the aligned rows 214a, 214b, 244a, 244b of the capacitive sensors 224 and the inductive sensors 246. Thus the fourth array 260 comprises at least one central row 262c of guard elements 258, each central row 262c extending along a respective central region 263 of the substrate and parallel with the two outer rows 262a, 262b of guard elements 258.

Each guard element 258 comprises a coil or an electrode which is adapted, when electrically energized in use, to provide a screening electromagnetic field defining an extremity of a sensing zone of the electromagnetic sensor 202. The three rows 262a, 262b, 262c of the guard elements 258 define and surround two mutually spaced imaging zones when the substrate 204 is flexed to form a ring, as described above for the first embodiment, each imaging zone being associated with a respective combined annular array of the capacitive sensors 224 and the inductive sensors 246. Again, the guard elements 258 may have the same shape and configuration in the direction of a plane extending parallel to the substrate as the first and second sensor elements 208, 238.

As described with reference to the first embodiment, the electromagnetic sensor 202 further comprises a plurality of electrical connectors, and a plurality of electrical terminals, on the plates 206a, 206b of the substrate 204. As for the first embodiment, the electrical connectors electrically connect the sensor elements 208, 238, and the guard elements 258, to the electrical terminals according to a predetermined wiring diagram. The electrical connectors, and/or the electrical terminals electrically connect the plates 206a, 206b to each other to provide a common electrical connection for the electromagnetic sensor 202.

When the electromagnetic sensor 202 is flexed to surround a volume to be interrogated as described above for the first embodiment, a plurality of annular arrays of the sensor elements 208, 238 comprise a sequence extending in a direction parallel to the central axis, the sequence comprising a first annular array in which the first and second sensor elements 208, 238 at least partly overlap, and a second annular array in which the first and second sensor elements 208, 238 at least partly overlap. The sequence further comprises an annular array of the guard elements 258 at each end of the sequence. The sequence further comprises an annular array of the guard elements 258 at a centre of the sequence and between the first and second annular arrays. This sequence defines two separate, but substantially adjacent, imaging spaces.

Figure 6:
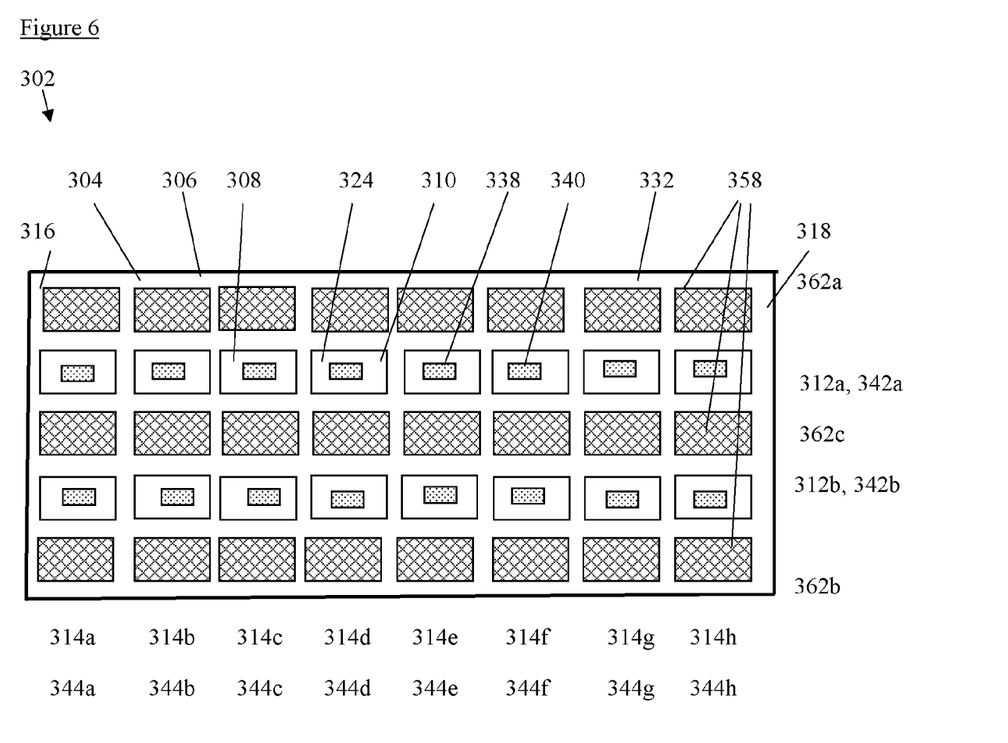
FIG. 6 is a is a schematic plan view of an electromagnetic sensor for use in an apparatus for measuring electromagnetic properties of a fluid and/or a solid in accordance with a third embodiment of the present invention.

A third embodiment of the electromagnetic sensor of the present invention is illustrated in FIG. 6.

The third embodiment differs from the second embodiment by providing (i) that the first and second sensors only partly overlap, (ii) the substrate comprises a single layer, and (iii) the first and second sensors are mounted in a stacked configuration on a common mounting surface of the substrate.

Referring to FIG. 6, the electromagnetic sensor 302 comprises a substrate 304 in the form of a flexible printed circuit board forming a plate 306.

A plurality of first sensor elements 308 comprising capacitive sensors 324 are provided on the plate 306 of the substrate 304 to form a first array 310 of the first sensor elements 308 on the substrate 304. The first array 310 is a regular array.

In this embodiment, the first array 310 is a rectangular array 310 comprising two parallel rows 312a, 312b of the first sensor elements 308 extending between opposite ends 316, 318 of the substrate 304 and eight columns 314a-314h of the first sensor elements 308. In this embodiment, the rows 312a, 312b of the first sensor elements 308 are spaced from each other and the columns 314a-314h are adjacent to each other.

A plurality of second sensor elements 338 are provided on the plate 306 of the substrate 304 to form a second array 340 on the substrate 304. Like the first array 310, the second array 340 is a regular array. In the illustrated embodiment, the first and second arrays 310, 340 are mounted on a common mounting surface 332 of the plate 306.

The first and second arrays 310, 340 are mutually aligned geometrically.

In this embodiment, the second array 340 is a rectangular array 340 comprising two parallel rows 342a, 342b of the second sensor elements 338 extending between the opposite ends 316, 318 of the substrate 304 and eight columns 344a-344h of the second sensor elements 338. The rows 342a, 342b of the second sensor elements 338 are mutually spaced. The columns 344a-344h are adjacent to each other.

The rows 312a-312b of the first sensor elements 308 are aligned with the columns 342a-342b of the second sensor elements 338 and the columns 314a-314h of the first sensor elements 308 are aligned with the columns 344a-344h of the second sensor elements 338. Accordingly, in the illustrated embodiment the first and second sensor elements 308, 338 are positioned so that the first and second sensor elements 308, 338 are aligned and at least partly overlap. This alignment is achieved by providing that the at least partly overlapping first and second sensor elements 308, 338 are in a stacked configuration on the common mounting surface 332 of the substrate 304. The stacked configuration is typically achieved by sequential mounting, e.g. by printing, of the first and second sensor elements 308, 338 on the common mounting surface 332.

The shape and dimensions of the first and second sensor elements 308, 338 provide partial overlap between each pair of first and second sensor elements 308, 338. Alternatively the overlap is complete. Accordingly, at least one, or each, first sensor element 308 at least partly overlaps, in the direction of a plane extending parallel to the substrate 304, a respective second sensor element 338 and at least one, or each, second sensor element 338 at least partly overlaps, in the direction of a plane extending parallel to the substrate 304, a respective first sensor element 308.

As for the first and second embodiments, the first and second types of sensor 308, 338 respectively comprise the capacitive sensors 324 and the inductive sensors 344. In other embodiments, these two types of sensor may be reversed, or either type of sensor may be replaced by any other sensor of a different type. For example, in other embodiments, either of the capacitive sensors 324 or the inductive sensors 344 may be replaced by a magnetic sensor.

In a further modified embodiment, the sensors may comprise three sensor types, each in a respective regular array geometrically aligned with the other arrays, and comprise, in combination, capacitive sensors, inductive sensors and magnetic sensors.

The electromagnetic sensor 302 further comprises a plurality of guard elements 358 provided on the substrate 304. The guard elements 358 form a fourth array 360 which comprises two parallel outer rows 362a, 362b of guard elements 358, and a parallel central row 362c of guard elements 358. Each outer row 362a, 362b of guard elements 358 extends along a respective opposite edge of the substrate 304, and the central row 362c of guard elements 358 extends between the aligned rows 314a, 314b, 344a, 344b of the capacitive sensors 324 and the inductive sensors 344. Thus the fourth array 360 comprises at least one central row 362c of guard elements 358, each central row 362c extending along a respective central region 363 of the substrate and parallel with the two outer rows 362a, 362b of guard elements 358.

Each guard element 358 comprises a coil or an electrode which is adapted, when electrically energized in use, to provide a screening electromagnetic field defining an extremity of a sensing zone of the electromagnetic sensor 302. The three rows 362a, 362b, 362c of the guard elements 358 define and surround two mutually spaced imaging zones when the substrate 304 is flexed to form a ring, as described above for the first embodiment, each imaging zone being associated with a respective combined annular array of the capacitive sensors 324 and the inductive sensors 344. Again, the guard elements 358 may have the same shape and configuration in the direction of a plane extending parallel to the substrate as the first and second sensor elements 308, 338.

The electromagnetic sensor 302 further comprises a plurality of electrical connectors, and a plurality of electrical terminals, on the plate 306 of the substrate 304, as described above for the first embodiment. As for the first embodiment, the electrical connectors electrically connect the sensor elements 308, 338, and the guard elements 358, to the electrical terminals according to a predetermined wiring diagram.

When the electromagnetic sensor 302 is flexed to surround a volume to be interrogated as described above for the first embodiment, a plurality of annular arrays of the sensor elements 308, 338 comprise a sequence extending in a direction parallel to the central axis, the sequence comprising a first annular array in which the first and second sensor elements 308, 338 at least partly overlap, and a second annular array in which the first and second sensor elements 308, 338 at least partly overlap. The sequence further comprises an annular array of the guard elements 358 at each end of the sequence. The sequence further comprises an annular array of the guard elements 358 at a centre of the sequence and between the first and second annular arrays. This sequence defines two separate, but substantially adjacent, imaging spaces.

In the embodiment of FIG. 5 the first and second sensor elements 208, 238 overlap and are provided on separate plates 206a, 206b in the form of printed circuit board, and each sensor element 208, 238 has a continuous surface defined by an endless peripheral edge. In the embodiment of FIG. 6 the first and second sensor elements 308, 338 overlap and are provided on a common plate 306 in the form of printed circuit board, and each sensor element 308, 338 has a continuous surface defined by an endless peripheral edge. In an alternative embodiment, which may be a modification of either of the embodiments of FIG. 5 or 6, at least one, or each, first sensor element 408 is at least partly surrounded, in the direction of a plane extending parallel to the substrate 404, by a respective second sensor element 438 and at least one, or each, second sensor element 438 at least partly surrounds, in the direction of a plane extending parallel to the substrate 404, a respective first sensor element 408.

Figure 7:
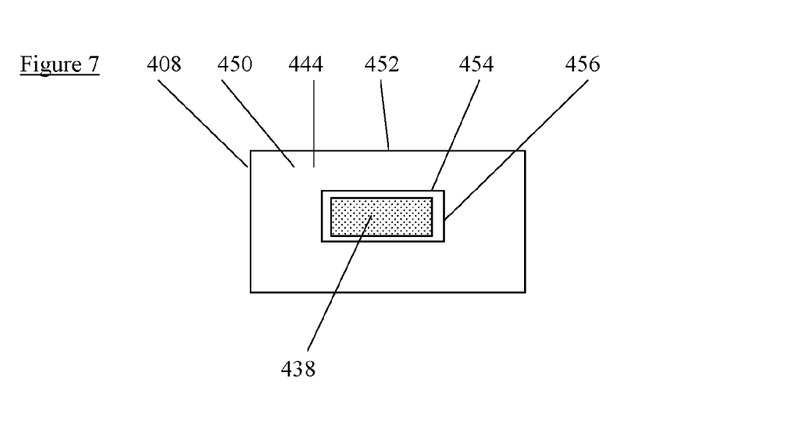
FIG. 7 is a schematic plan view of a combined sensor element in an electromagnetic sensor for use in an apparatus for measuring electromagnetic properties of a fluid and/or a solid in accordance with a fourth embodiment of the present invention.

As shown in FIG. 7, the combined arrangement of the first and second sensor elements 408, 438 may comprise a first sensor element 408 in the form of a coil 450, thereby comprising an inductive sensor 444, having an external peripheral edge 452 and an internal peripheral edge 454 defining a central cavity 456 in which is located a second sensor element 438 in the form of a capacitive sensor 444, or an alternative embodiment, a magnetic sensor. In the illustrated embodiment, the second sensor element 438 is located inwardly of the internal peripheral edge 454 of the first sensor element 408 and there is no overlap therebetween; however in alternative embodiments there may be partial overlap of the second sensor element 438 and the internal peripheral edge 454 of the first sensor element 408. Any of these arrangements may be used in any embodiment of the invention described herein.

Figure 8:
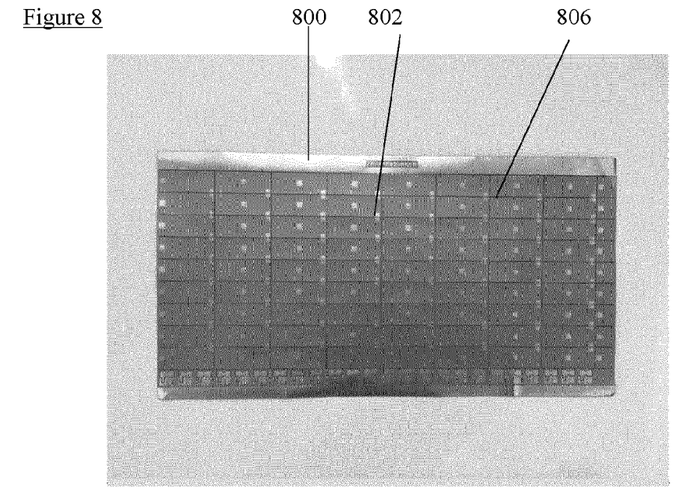
FIGS. 8 and 9 are photographs of, respectively, a front side and a rear side of a sensor according to a further embodiment of the present invention.
Figure 9:
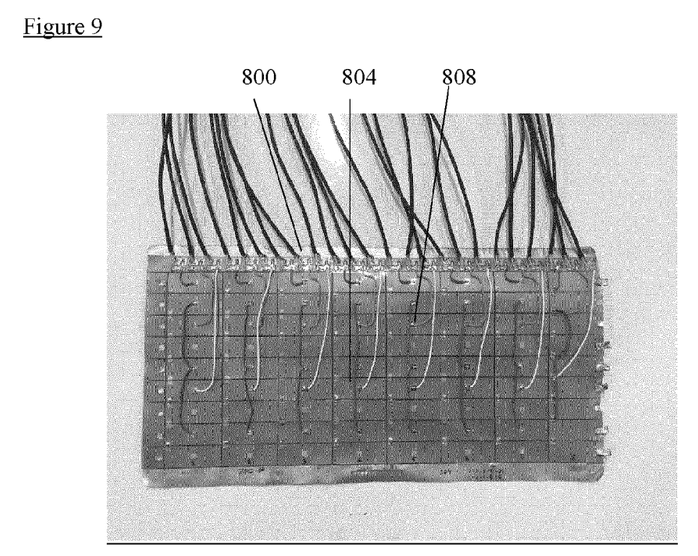

FIGS. 8 and 9 are photographs of a sensor 800 in the form of a flexible printed circuit board according to an embodiment of the present invention. FIG. 8 shows the front side 802 of the sensor 800 and FIG. 9 shows the rear side 804 of the sensor 80. The front side 802 is provided with sensor and guard arrays in a 9 row×8 column grid 806. The rear side 804 is provided with electrical wiring 808 electrically connecting the sensor and guard arrays.

Accordingly, in the various embodiments of the present invention, first and second sensor elements and guard elements may be provided on the substrate in the form of a grid, typically a rectangular grid having elements $E_{m,n,z}$, where m≥1, n≥1, z≥1, where m is the number of rows, n is the number of column and z is the number of layers, for any combination of m, n and z. Interconnections may be made along any axis of the grid. Each sensor element may be an inductive sensor, a capacitive sensor, an electrode or any other type of sensor. Any sensor element of any type may be located wholly within, or may partially or wholly overlap, another sensor of any other type. Each sensor element may be configured in a sole transmitting mode, a sole receiving mode or a sole guard mode, or a dual transmitting and receiving mode, or any other desired operating mode.

Various other embodiments of the electromagnetic sensor and monitoring apparatus of the present invention within the scope of the appended claims will readily be apparent to those skilled in the art.

The invention claimed is:

1. An apparatus for measuring electromagnetic properties of a fluid and/or a solid, the apparatus comprising:
an electromagnetic sensor which comprises a substrate in the form of a plate which comprises at least one printed circuit board, a plurality of first sensor elements printed on the at least one printed circuit board, the first sensor elements forming a first array of the first sensor elements on the substrate, a plurality of second sensor elements printed on the at least one printed circuit board, the second sensor elements forming a second array on the substrate, wherein the first and second arrays are regular arrays and are mutually aligned geometrically, a plurality of electrical connectors on the substrate, and a plurality of electrical terminals on the substrate, the electrical connectors electrically connecting the first and second sensor elements to the electrical terminals, wherein the first sensor elements each comprise a first type of sensor selected from an inductive sensor, a capacitive sensor and a magnetic sensor and the second sensor elements each comprise a second type of sensor selected from an inductive sensor, a capacitive sensor and a magnetic sensor, wherein the first type of sensor and the second type of sensor are different, wherein the substrate is flexible and is flexed to form a closed or open ring respectively completely or partly surrounding a central axis, and the first and second arrays form a plurality of annular arrays of the first or second sensor elements surrounding the axis, wherein each annular array is formed from a row of the respective first or second sensor elements in the respective first and second arrays, and the annular arrays define a central measurement zone surrounded by the annular arrays, wherein each first sensor element is wholly surrounded, in the direction of a plane extending parallel to the substrate, by a respective second sensor element and the second sensor element wholly surrounds, in the direction of a plane extending parallel to the substrate, the respective first sensor element, wherein the second sensor element has an external peripheral edge and an internal peripheral edge defining a central cavity in which is located the respective first sensor element, and the first sensor element is located inwardly of the internal peripheral edge of the second sensor element and there is no overlap between the respective first and second sensor elements.

2. The apparatus according to claim 1, wherein each of the first and second arrays is a rectangular array comprising at least one row of the respective first and second sensor elements and a plurality of columns of the respective first and second sensor elements and wherein one of the first array or second array is located on a central region of the substrate and the other of the second array or first array is located on mutually spaced side regions of the substrate which are on respective opposite sides of the central region of the substrate.

3. The apparatus according to claim 1, further comprising a plurality of third sensor elements printed on a surface of the at least one printed circuit board, the third sensor elements forming a third array of the third sensor elements on the substrate, wherein the third sensor elements each comprise a third type of sensor selected from an inductive sensor, a capacitive sensor and a magnetic sensor, wherein the first, second and third types of sensor are different, wherein the electrical connectors connect the third sensor elements to the electrical terminals.

4. The apparatus according to claim 1, further comprising a plurality of guard elements printed on a surface of the at least one printed circuit board, the guard elements forming a fourth array of the guard elements on the substrate, wherein the fourth array comprises two parallel outer rows of guard elements, wherein each outer row of guard elements extends along a respective opposite edge of the substrate, wherein each guard element comprises a coil or an electrode which is adapted, when electrically energized in use, to provide a screening electromagnetic field defining an extremity of a sensing zone of the electromagnetic sensor, wherein the electrical connectors interconnect the plurality of guard elements and connect the guard elements to the electrical terminals.

5. The apparatus according to claim 4, wherein the fourth array further comprises at least one central row of guard elements, each central row extending along a respective central region of the substrate and parallel with the two outer rows of guard elements.

6. The apparatus according to claim 1, wherein each inductive sensor comprises a coil of electrically conductive material which is wound about a central axis to form at least one turn, wherein the electrically conductive material is selected from copper, graphene, or carbon.

7. The apparatus according to claim 6, wherein each turn is in a common plane so that the respective coil is planar and in a single layer of the inductive sensor.

8. The apparatus according to claim 6, wherein the coil is non-planar and formed in 1 to 8 layers of the inductive sensor, each layer of the inductive sensor comprising at least one turn.

9. The apparatus according to claim 6, wherein each turn is composed of four linear sections and the respective coil is rectangular in plan, wherein the rectangular coil has a width:length ratio of from 1:2 to 2:1.

10. The apparatus according to claim 1, wherein each capacitive sensor comprises a central layer of dielectric material between opposite layers of electrically conductive material, wherein the electrically conductive material is selected from copper, graphene, or carbon.

11. The apparatus according to claim 1, wherein the apparatus further comprises a plurality of guard elements printed on a surface of the at least one printed circuit board, the guard elements forming a fourth array of the guard elements on the substrate, wherein the fourth array comprises two parallel outer rows of guard elements, and, wherein the sequence further comprises an annular array of the guard elements at each end of the sequence.

12. The apparatus according to claim 11, wherein the sequence further comprises an annular array of the guard elements at a center of the sequence and between the first and second annular arrays.

* * * * *